US010864505B2

(12) United States Patent
Khanmamedova et al.

(10) Patent No.: US 10,864,505 B2
(45) Date of Patent: Dec. 15, 2020

(54) PROCESS FOR PREPARING HYDROCRACKING CATALYST

(71) Applicant: SABIC GLOBAL TECHNOLOGIES B.V., Bergen op Zoom (NL)

(72) Inventors: Alla Khanmamedova, Sugar Land, TX (US); Ashim Kumar Ghosh, Houston, TX (US); Scott Stevenson, Houston, TX (US); David Sullivan, Little Ferry, NJ (US); Pooja Bajaj, Schenectady, NY (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 234 days.

(21) Appl. No.: 15/780,296

(22) PCT Filed: Dec. 5, 2016

(86) PCT No.: PCT/EP2016/079702
§ 371 (c)(1),
(2) Date: May 31, 2018

(87) PCT Pub. No.: WO2017/093550
PCT Pub. Date: Jun. 8, 2017

(65) Prior Publication Data
US 2018/0353944 A1 Dec. 13, 2018

(30) Foreign Application Priority Data
Dec. 3, 2015 (EP) .................................... 15197801

(51) Int. Cl.
*B01J 29/068* (2006.01)
*B01J 29/44* (2006.01)
*B01J 37/30* (2006.01)
*B01J 37/02* (2006.01)
*B01J 23/42* (2006.01)
*B01J 35/00* (2006.01)
*B01J 37/18* (2006.01)
*C10G 47/18* (2006.01)
*B01J 35/02* (2006.01)
*B01J 37/08* (2006.01)
*C10G 45/64* (2006.01)

(52) U.S. Cl.
CPC .............. *B01J 29/44* (2013.01); *B01J 23/42* (2013.01); *B01J 29/068* (2013.01); *B01J 35/002* (2013.01); *B01J 35/0073* (2013.01); *B01J 35/0093* (2013.01); *B01J 35/023* (2013.01); *B01J 37/0201* (2013.01); *B01J 37/08* (2013.01); *B01J 37/18* (2013.01); *B01J 37/30* (2013.01); *C10G 45/64* (2013.01); *C10G 47/18* (2013.01); *B01J 2229/20* (2013.01)

(58) Field of Classification Search
CPC ...... B01J 29/068; B01J 29/44; B01J 2229/20; B01J 35/002; B01J 35/0073; B01J 35/023; B01J 35/0093; B01J 37/30; B01J 37/08; B01J 37/0201; B01J 37/18
USPC ......... 502/60, 63, 64, 66, 69, 71, 74, 77, 86
See application file for complete search history.

(56) References Cited

U.S. PATENT DOCUMENTS

| | | | |
|---|---|---|---|
| 3,433,848 A | | 3/1969 | Devins et al. |
| 3,960,709 A | * | 6/1976 | Hayes .................... B01J 23/624 208/139 |
| 4,079,092 A | * | 3/1978 | Hayes .................. B01J 23/8913 208/108 |
| 4,082,649 A | * | 4/1978 | Pollitzer .............. B01J 23/8966 208/111.1 |
| 4,556,646 A | | 12/1985 | Bezman |
| 4,912,077 A | * | 3/1990 | Lachman ........... B01D 53/8609 502/302 |
| 5,164,074 A | * | 11/1992 | Houghton .............. C10G 45/72 208/209 |
| 5,348,924 A | * | 9/1994 | Potter .................... B01J 20/186 502/10 |
| 6,506,703 B1 | * | 1/2003 | Kao ....................... B01J 29/068 502/64 |
| 7,186,871 B2 | | 3/2007 | Mitchell et al. |
| 9,068,125 B2 | | 6/2015 | Diehl et al. |
| 2002/0092797 A1 | * | 7/2002 | Choi ....................... B01J 29/44 208/111.35 |

FOREIGN PATENT DOCUMENTS

| | | |
|---|---|---|
| CN | 101455979 A | 6/2009 |
| CN | 104338551 A | 2/2015 |
| WO | 2007006473 A1 | 1/2007 |
| WO | 2008015027 A1 | 2/2008 |

(Continued)

OTHER PUBLICATIONS

European Office Action for European Application No. 15197801.2; Application Filing Date Dec. 3, 2015; dated Apr. 22, 2020, 5 pages.
Bhirud, "Chances for Innovative Processes at the Interface between Refining and Petrochemistry" Proceedings of the DGMK Conference (2002) 10 Pages.
International Search Report for International Application No. PCT/EP2016/079702; International Filing Date: Dec. 5, 2016; dated Feb. 10, 2017; 5 Pages.

(Continued)

*Primary Examiner* — Elizabeth D Wood
(74) *Attorney, Agent, or Firm* — Cantor Colburn LLP

(57) ABSTRACT

The invention relates to a process for preparing a hydrocracking catalyst, comprising (i) contacting a shaped body comprising a zeolite and a binder with an aqueous solution of a hydrogenation metal compound which is a complex or a salt of a hydrogenation metal to deposit the hydrogenation metal onto the shaped body, wherein the aqueous solution comprises an ammonium salt and (ii) calcining the shaped body obtained by step (i).

20 Claims, No Drawings

(56) References Cited

FOREIGN PATENT DOCUMENTS

WO     2013182534 A1    12/2013

OTHER PUBLICATIONS

Kirk-Othmer Encyclopedia of Chemical Technology, "Molecular Sieves," Fifth Edition, vol. 16, (2006), pp. 811-853.
Le Page, "Applied Heterogeneous Catalysis: Design, Manufacture, Use of Solid Catalysts," (1987) Institut Francais due Petrole Publications; pp. 1-7.
Rase, Handbook of Commercial Catalysts: Heterogeneous Catalysts ed. (2000) CRCPRess p. 211-212.
Written Opinion of the International Searching Authority for International Application No. PCT/EP2016/079702; International Filing Date: Dec. 5, 2016; dated Feb. 10, 2017; 5 Pages.
Search Report in Chinese Application No. 2016800643624; dated Aug. 27, 2019.

\* cited by examiner

PROCESS FOR PREPARING HYDROCRACKING CATALYST

CROSS REFERENCE TO RELATED APPLICATIONS

This application is a 371 of International Application No. PCT/EP2016/079702, filed Dec. 5, 2016, which claims priority to European Application No. 15197801.2 filed Dec. 3, 2015, which are incorporated herein by reference in their entirety.

The present invention relates to a process for preparing a hydrocracking catalyst and the catalyst obtainable thereby. The present invention also relates to a process for hydrocracking a feed stream comprising hydrocarbons using the catalyst.

A hydrocracking catalyst comprising a hydrogenation metal, a zeolite and a binder is well-known. For example, WO2008015027 describes a process for the catalytic hydrodealkylation of hydrocarbon compositions by treating said hydrocarbon compositions with a catalyst in the presence of hydrogen. The catalyst consists of a ZSM-5 zeolite, has a Si/Al molar ratio within the range of 5 to 100, and is modified by means of the metals platinum and molybdenum. In the examples of WO2008015027, the catalyst is obtained by mixing a ZSM-5 zeolite and an alumina as a binder, extruding the mixture, calcining the extruded product and crushing and sieving to produce a catalyst powder. This catalyst powder is impregnated with an aqueous solution of ammonium molybdate followed by an impregnation with an aqueous solution of platinum tetraamine nitrate and a subsequent calcination.

WO2013/182534 discloses a process for producing BTX from a $C_5$-$C_{12}$ hydrocarbon mixture using a hydrocracking/hydrodesulphurisation catalyst. According to WO2013/182534, the process results in a mixture comprising substantially no co-boilers of BTX, thus chemical grade BTX can easily be obtained. The catalyst used in WO2013/182534 comprises 0.1-1 wt-% hydrogenation metal in relation to the total catalyst weight and a zeolite having a silica ($SiO_2$) to alumina ($Al_2O_3$) molar ratio of 5-200.

WO2007/006473 discloses a process for improving the properties as a fuel of hydrotreated hydrocarbon blends which comprises putting said hydrotreated blends in contact with hydrogen, in the presence of a catalytic system, comprising: a) one or more metals selected from Pt, Pd, Ir, Ru, Rh and Re and b) a silico-aluminate of an acidic nature such a zeolite. The acid component is impregnated in an aqueous solution of a complex or salt of the metal such as $H_2PtCl_6$, $(NH_3)_4Pt(OH)_2$ and $(NH_3)_4PtCl_2$.

U.S. Pat. No. 7,186,871 discloses a process for aromatization of alkanes comprising contacting an alkane having one to four carbon atoms per molecule with a Pt/ZSM-5 catalyst under conditions to convert the alkane to benzene, toluene and xylenes and byproducts of methane and ethane. In U.S. Pat. No. 7,186,871, the catalyst was a commercially available zeolite ZSM-5 (Zeolyst CBV5514) of $SiO_2$/$Al_2O_3$=50 bound with alumina (50 wt %) zeolite which was ion exchanged with 40 ml of $Pt(NH_3)_4(NO_3)_2$ solution of concentrations ranging from 0.002-0.005 M for 24 h at 60° C. The catalyst was subsequently dried and calcined. The catalyst of U.S. Pat. No. 7,186,871 is not used for hydrocracking.

There is a need in the industry for a process for the preparation of a catalyst with a high hydrocracking activity.

It is an objective of the invention to provide a process for the preparation of a catalyst with a high hydrocracking activity.

Accordingly, the present invention provides a process for preparing a hydrocracking catalyst, comprising (i) contacting a shaped body comprising a zeolite and a binder with an aqueous solution of a hydrogenation metal compound which is a complex or a salt of a hydrogenation metal to deposit the hydrogenation metal onto the shaped body, wherein the aqueous solution comprises an ammonium salt and (ii) calcining the shaped body obtained by step (i).

It was found that a catalyst prepared by depositing Pt on an extrudate comprising a zeolite and a binder by using an aqueous solution of a salt of tetraamineplatinum has an uneven distribution of Pt between the outer surface and the inner body of the extrudate. In this case, Pt was found to deposit mainly on the outer surface of the extrudate, which leads to a poorer catalyst performance.

It was surprisingly found that the addition of an ammonium salt to the aqueous solution of a hydrogenation metal compound led to a uniform incorporation of the hydrogenation metal on the shaped body. The addition of the ammonium salt, which is an electrolyte, to the aqueous solution leads to the change in the ionic strength and overall electrostatics of solid/solution interaction can be controlled. Thus, it was found that sequential strong adsorption of ions of the hydrogenation metal on the outer surface of the shaped body can be prevented, resulting in uniform distribution of the hydrogenation metal over the shaped body.

Shaped Body

Step (i) involves contacting a shaped body comprising a zeolite and a binder with an aqueous solution of a hydrogenation metal compound for depositing the hydrogenation metal onto the shaped body e.g. by ion exchange or impregnation. In the case of ion exchange, the shaped body is contacted with the solution and subsequently washed and dried. In the case of impregnation, the shaped body is contacted with the solution and liquid is subsequently evaporated from the shaped body. The hydrogenation metal is thereby deposited on the shaped body. In a catalyst obtained by such process, without wishing to be bound by theory, the distance between the hydrogenation metal and the zeolite acid site is less than that in a catalyst obtained by mixing a shaped zeolite body with a binder on which a hydrogenation metal is supported. An example of the latter would be a mixture of two catalysts: ZSM-5 zeolite extrudate, and Pt deposited on shaped $Al_2O_3$.

Examples of the shaped bodies include, but are not limited to, spherically or cylindrically shaped pellets, tablets, particles and extrudates. The shaped body typically has an average diameter of about 0.1 mm to about 7 mm, typically 1.4 mm to 3.5 mm. The diameter is usually measured by slide caliper. The shaped body typically has an average length of 3 to 8 mm. The average as used herein is an arithmetic average. One specific example of the shaped body is a cylindrically shaped extrudate with an average diameter of about 1.6 mm (1/16 inch) with an average length of extrudates about 3 to 8 mm.

Zeolites are well-known molecular sieves having three dimensional structures with well-defined channels, pores, cavities with defined pore size. As used herein, the term "zeolite" or "aluminosilicate zeolite" relates to an aluminosilicate molecular sieve. An overview of their characteristics is for example provided by the chapter on Molecular Sieves in Kirk-Othmer Encyclopedia of Chemical Technology, Volume 16, p 811-853; in Atlas of Zeolite Framework Types, 5th edition, (Elsevier, 2001).

Preferably, the hydrocracking catalyst comprises a medium pore aluminosilicate zeolite or a large pore aluminosilicate zeolite. Suitable zeolites include, but are not limited to, ZSM-5, MCM-22, ZSM-11, beta zeolite, EU-1 zeolite, faujasite (zeolite Y), ferrierite and mordenite. The term "medium pore zeolite" is commonly used in the field of zeolite catalysts.

Accordingly, a medium pore zeolite such as ZSM-5 zeolite is a zeolite having a pore size of about 5-6 Å. Suitable medium pore size zeolites are 10-ring zeolites, i.e. the pore is formed by a ring consisting of 10 tetrahedra of $[SiO_4]$ and $[AlN_4]^-$. The negative charge arising from $[AlO_4]^-$ is neutralized by a cation in the zeolite. Suitable large pore zeolites have a pore size of about 6-8 Å and are of the 12-ring structure type. Zeolites of the 8-ring structure type are called small pore size zeolites. In the above cited Atlas of Zeolite Framework Types various zeolites are listed based on ring structure. Most preferably the zeolite is ZSM-5 zeolite, which is a well-known zeolite having MFI structure.

Preferably, the silica ($SiO_2$) to alumina ($Al_2O_3$) molar ratio of the (ZSM-5) zeolite is in the range of 20-200, more preferably in the range of 20-100, more preferably 25-75.

Using a zeolite having a $SiO_2$ to $Al_2O_3$ molar ratio of 25-75 shows the optimum catalyst hydrocracking performance to obtain BTX, as measured by activity (as measured by WHSV), contents of benzene and total aromatics (BTX, ethylbenzene (EB) and heavies) and methane in the product stream. Means and methods for quantifying the $SiO_2$ to $Al_2O_3$ molar ratio of a zeolite are well known in the art and include, but are not limited to AAS (Atomic Absorption Spectrometer), ICP (Inductively Coupled Plasma Spectrometry) analysis or XRF (X-ray fluorescence). It is noted that the $SiO_2$ to $Al_2O_3$ molar ratio referred herein is meant as the ratio in the zeolite prior to being mixed with the binder for forming the shaped body. Preferably, the $SiO_2$ to $Al_2O_3$ molar ratio is measured by XRF.

Preferably, the silica to alumina ratio of the ZSM-5 zeolite is in the range of 30-65, more preferably 35-60, more preferably in the range of 40-55. At such ratio, in particular when the silica to alumina ratio is at least 35, the best balance of total aromatics and methane content in the hydrocracking product stream and achievable WHSV for a desired benzene purity is obtained.

Preferably, the zeolite is in the hydrogen form, i.e. having at least a portion of the original cations associated therewith replaced by $H^+$ ions. Methods to convert an aluminosilicate zeolite to the hydrogen form are well known in the art. A first method involves direct treatment employing an acid, for example a mineral acid ($HNO_3$, HCl, etc.). A second method involves direct exchange using an ammonium salt (e.g. $NH_4NO_3$) followed by calcination.

The shaped body comprises a binder as well as a zeolite. The hydrogenation metal is deposited on the shaped body. The presence of the binder in the shaped body gives adequate crush strength to the catalyst to withstand the pressure in a larger reactor.

The binder material can be inorganic oxide materials. The binder material can comprise an aluminum- or silicon-containing material such as silica, alumina, clay, aluminum phosphate, silica-alumina, or combinations comprising at least one of the foregoing. Alumina ($Al_2O_3$) is a preferred binder. The catalyst can comprise up to 99 wt %, e.g., 1 to 99 wt %, for example 10 to 50 wt % or 20 to 40 wt % of a binder material based on the total weight of the catalyst.

Aqueous Solution

The hydrogenation metal compound in the aqueous solution is a complex or a salt of a hydrogenation metal.

Preferably, the hydrogenation metal is at least one element selected from Group 10 of the periodic table of elements or rhodium or iridium. The preferred Group 10 elements are palladium and platinum, particularly platinum.

Preferably, the hydrogenation metal compound is a metal amine complex. Preferably, the hydrogenation metal compound is selected from the group consisting of a nitrate, a hydroxide hydrate and a chloride. Preferably, the hydrogenation metal compound is selected from the group consisting of $(NH_3)_4Pt(NO_3)_2$, $(NH_3)_4Pt(OH)_2$ and $(NH_3)_4PtCl_2$.

The aqueous solution comprises an ammonium salt. Preferably, the ammonium salt is selected from the group consisting of $NH_4Cl$, $NH_4NO_3$, $(NH_4)_2CO_3$ and $NH_4HCO_3$, and preferably is $(NH_4)_2CO_3$.

When the hydrogenation metal compound or the ammonium salt comprises chloride, the resulting catalyst may contain residual chloride species which may cause corrosion at the downstream equipment used for catalytic process and also chloride species may change properties of the catalyst. Accordingly, it is preferred that the hydrogenation metal compound is free of chloride. Preferably, the ammonium salt is free of chloride. More preferably, the hydrogenation metal compound is free of chloride and the ammonium salt is free of chloride.

Preferably, the hydrogenation metal compound is free of chloride, preferably selected from the group consisting of $(NH_3)_4Pt(NO_3)_2$ and $(NH_3)_4Pt(OH)_2$.

Preferably, the ammonium salt is free of chloride, preferably selected from the group consisting of $NH_4NO_3$, $(NH_4)_2CO_3$ and $NH_4CO_3$.

Step (ii)

The shaped body obtained by step (i), i.e. the shaped body onto which the hydrogenation metal is deposited, is calcined. This step is very well-known and suitable temperatures and periods for the calcination for obtaining the final catalyst are very well-known, for example 250-300° C. for 2-8 hours.

Obtained Catalyst

Preferably, the catalyst according to the process of the present invention comprises 0.010-0.30 wt %, more preferably 0.010-0.15 wt %, of hydrogenation metal. In the context of the present invention, the term "wt %" when relating to the metal content as comprised in a catalyst relates to the wt % of said metal in relation to the total weight of the hydrogenation metal, the zeolite and the binder. The amount of the hydrogenation metal in the catalyst can be determined e.g. by subjecting the catalyst to XRF.

Preferably, the catalyst comprises 0.015-0.095 wt % of hydrogenation metal. The catalyst comprising the hydrogenation metal in this range has a particularly high benzene yield when used in a hydrocracking process for obtaining BTX. Even more preferably, the catalyst comprises 0.020-0.090 wt %, 0.035-0.080 or 0.040-0.075 wt % of hydrogenation metal. In such ranges, the amount of benzene loss (decrease of amount of benzene in the hydrocracking product stream with respect to the hydrocracking feed stream) by the process of the invention and the amount of methane in the hydrocracking product stream is particularly low. The amount of the total aromatics (BTX, ethylbenzene (EB) and heavies) in the hydrocracking product stream is particularly high.

The hydrocracking catalyst used in the process of the invention should have a sufficient hydrogenation activity.

Accordingly, it is preferred that the catalyst does not comprise secondary metals, such as tin, lead or bismuth that inhibit the hydrogenation activity of the hydrogenation metal. Preferably, the hydrocracking catalyst used in the process of the present invention accordingly comprises less than 0.01 parts tin and less than 0.02 parts lead and less than 0.01 parts bismuth (on the basis of 100 parts by weight of the total catalyst), preferably less than 0.005 parts tin and less than 0.01 parts lead and less than 0.005 parts bismuth (on the basis of 100 parts by weight of total catalyst).

Further, preferably, the hydrocracking catalyst used in the process of the present invention accordingly comprises less than 0.01 parts molybdenum (on the basis of 100 parts by weight of the total catalyst).

The invention also relates to the catalyst obtained by or obtainable by the process according to the invention.

The invention further relates to a process for hydrocracking a feed stream comprising hydrocarbons by contacting the feed stream in the presence of hydrogen with the catalyst according to the invention. The process is preferably a process for obtaining BTX.

Preferably, the process according to the invention comprises (a) providing a hydrocracking feed stream comprising $C_5$-$C_{12}$ hydrocarbons, (b) contacting the hydrocracking feed stream in the presence of hydrogen with the hydrocracking catalyst under process conditions including a temperature of 400-580° C. (preferably 425-580° C.), a pressure of 300-5000 kPa gauge and a Weight Hourly Space Velocity of 3-30 $h^{-1}$ to produce a hydrocracking product stream comprising BTX and (c) separating the BTX from the hydrocracking product stream.

As used herein, the term "$C_n$ hydrocarbons", wherein "n" is a positive integer, is meant to describe all hydrocarbons having n carbon atoms. Moreover, the term "$C_{n+}$ hydrocarbons" is meant to describe all hydrocarbon molecules having n or more carbon atoms. Accordingly, the term "$C_{5+}$ hydrocarbons" is meant to describe a mixture of hydrocarbons having 5 or more carbon atoms.

Hydrocracking Feed Stream

The hydrocracking feed stream used in the process of the present invention is a mixture comprising $C_5$-$C_{12}$ hydrocarbons, preferably having a boiling point in the range of 30-195° C. Preferably, the hydrocracking feed stream mainly comprises $C_6$-$C_8$ hydrocarbons.

The hydrocracking feed stream may be provided by providing a fresh feed stream and optionally mixing it with another stream, such as a stream recycled from the hydrocracking product stream, such as toluene if desired. This mixing with another stream is optional. If mixing with e.g. a recycle stream does not take place, the hydrocracking feed stream is the same as the fresh feed stream. Suitable examples of fresh feed streams include, but are not limited to first stage or multi-stage hydro-treated pyrolysis gasoline, straight run naphtha, hydrocracked gasoline, light coker naphtha and coke oven light oil, FCC gasoline, reformate or mixtures thereof, which have optionally been subjected to treatments such as hydrogenation, enrichment of mono-aromatic compounds and/or depentanization.

For instance, a typical composition of first stage hydro-treated pyrolysis gasoline may comprise 10-15 wt % $C_5$ olefins, 2-4 wt % $C_5$ paraffins and cycloparaffins, 3-6 wt % $C_6$ olefins, 1-3 wt % $C_6$ paraffins and naphthenes, 25-30 wt % benzene, 15-20 wt % toluene, 2-5 wt % ethylbenzene, 3-6 wt % xylenes, 1-3 wt % trimethylbenzenes, 4-8 wt % dicyclopentadiene, and 10-15 wt % $C_{9+}$ aromatics, alkyl-styrenes and indenes; see e.g. Table E3.1 from Applied Heterogeneous Catalysis: Design, Manufacture, and Use of Solid Catalysts (1987) J. F. Le Page.

It is preferred that the non-aromatic species comprised in the hydrocracking feed stream are saturated (e.g. by the prior hydrogenation) in order to reduce the exotherm within the catalyst bed containing the hydrocracking catalyst used in the present process. Accordingly, preferably, the fresh feed stream is a stream which has been hydrogenated. The hydrogenation advantageously has a further function of hydrodesulphurization. This is advantageous in that the resulting fresh feed stream has a low sulphur content. The low sulphur content in the fresh feed stream is advantageous in that the hydrocracking catalyst used according to the invention does not need to have a hydrodesulphurization function.

The fresh feed stream or the hydrocracking feed stream used in the process of the present invention may comprise up to 300 wppm of sulphur (i.e. the weight of sulphur atoms, present in any compound, in relation to the total weight of the feed).

In some embodiments, the fresh feed stream used in the process of the present invention is a stream which has been treated to be enriched in mono-aromatic compounds. As used herein, the term "mono-aromatic compound" relates to a hydrocarbon compound having only one aromatic ring. Means and methods suitable to enrich the content of mono-aromatic compounds in a mixed hydrocarbon stream are well known in the art such as the Maxene process; see Bhirud (2002) Proceedings of the DGMK-conference 115-122.

In some embodiments, the fresh feed stream used in the process of the present invention has been depentanized. Preferably, the fresh feed stream comprises at most 5 wt % of $C_5$ hydrocarbons, more preferably at most 4 wt %, at most 3 wt %, at most 2 wt %, at most 1 wt %, or $C_5$ hydrocarbons.

Preferably, the hydrocracking feed stream is provided by a process which does not involve the step of removing benzene or removing $C_6$ hydrocarbons. This means that intentional removal of benzene has not been performed in providing the hydrocracking feed stream or the fresh feed stream. The step of removing benzene typically induces the removal of coboilers of benzene. According to the present invention, the benzene coboilers present in the hydrocracking feed stream are advantageously converted to useful LPG.

Preferably, the hydrocracking feed stream may comprise at least 10 wt % of benzene, for example at least 20 wt % of benzene, at least 30 wt % of benzene or at least 40 wt % of benzene, and/or at most 90 wt % of benzene, for example at most 80 wt %, at most 70 wt %, at most 60 wt % or at most 50 wt % of benzene.

Preferably, the fresh feed stream may comprise at least 10 wt % of benzene, for example at least 20 wt % of benzene, at least 30 wt % of benzene or at least 40 wt % of benzene, and/or at most 90 wt % of benzene, for example at most 80 wt %, at most 70 wt %, at most 60 wt % or at most 50 wt % of benzene.

Step (b)

According to step (b) of the process according to the invention, the hydrocracking feed stream is contacted in the presence of hydrogen in a hydrocracking reactor with the hydrocracking catalyst of the invention.

The product produced by the hydrocracking step of the process of the present invention (hydrocracking product stream) comprises LPG, BTX and methane.

The term "LPG" as used herein refers to the well-established acronym for the term "liquefied petroleum gas". LPG generally consists of a blend of $C_2$-$C_4$ hydrocarbons i.e. a mixture of $C_2$, $C_3$, and $C_4$ hydrocarbons.

The term "BTX" as used herein is well known in the art and relates to a mixture of benzene, toluene and xylenes.

As used herein, the term "chemical grade BTX" relates to a hydrocarbon mixture comprising less than 5 wt % hydrocarbons other than benzene, toluene and xylenes, preferably less than 4 wt % hydrocarbons other than benzene, toluene and xylenes, more preferably less than 3 wt % hydrocarbons other than benzene, toluene and xylenes, and most preferably less than 2.5 wt % hydrocarbons other than benzene, toluene and xylenes.

Furthermore, the "chemical grade BTX" produced by the process of the present invention comprises less than 1 wt % non-aromatic $C_{6+}$ hydrocarbons, preferably less than 0.7 wt % non-aromatic $C_{6+}$ hydrocarbons, more preferably less than 0.5 wt % non-aromatic $C_{6+}$ hydrocarbons and most preferably less than 0.2 wt % non-aromatic $C_{6+}$ hydrocarbons. The most critical contaminants are the non-aromatic species which have boiling points close to benzene including, but not limited to, cyclohexane, methylcyclopentane, n-hexane, 2-methylpentane and 3-methylpentane.

Accordingly, the hydrocracking product stream is substantially free from non-aromatic $C_{6+}$ hydrocarbons. As meant herein, the term "hydrocracking product stream substantially free from non-aromatic $C_{6+}$ hydrocarbons" means that said hydrocracking product stream comprises less than 1 wt % non-aromatic $C_{6+}$ hydrocarbons, preferably less than 0.7 wt % non-aromatic $C_{6+}$ hydrocarbons, more preferably less than 0.5 wt % non-aromatic $C_{6+}$ hydrocarbons and most preferably less than 0.2 wt % non-aromatic $C_{6+}$ hydrocarbons.

The term "aromatic hydrocarbon" is very well known in the art. Accordingly, the term "aromatic hydrocarbon" relates to cyclically conjugated hydrocarbon with a stability (due to delocalization) that is significantly greater than that of a hypothetical localized structure (e.g. Kekulé structure). The most common method for determining aromaticity of a given hydrocarbon is the observation of diatropicity in the 1H NMR spectrum, for example the presence of chemical shifts in the range of from 7.2 to 7.3 ppm for benzene ring protons.

The hydrocracking product stream produced in the process of the present invention preferably comprises less than 5 wt % of methane. Preferably, the hydrocracking product stream produced in the process of the present invention comprises less than 4 wt % of methane, more preferably less than 3 wt % methane, even more preferably less than 2 wt % methane, even more preferably less than 1.5 wt % methane, even more preferably less than 1.4 wt % methane, even more preferably less than 1.3 wt % methane, even more preferably less than 1.2 wt % methane, even more preferably less than 1.1 wt % methane, and most preferably less than 1 wt % methane.

Preferably, the hydrocracking product stream is also substantially free from 05 hydrocarbons. As meant herein, the term "hydrocracking product stream substantially free from $C_5$ hydrocarbons" means that said hydrocracking product stream comprises less than 1 wt % $C_5$ hydrocarbons, preferably less than 0.7 wt % $C_5$ hydrocarbons, more preferably less than 0.6 wt % $C_5$ hydrocarbons and most preferably less than 0.5 wt % $C_5$ hydrocarbons.

It is a particular advantage of the method of the present invention that the hydrocracking product stream is substantially free from non-aromatic $C_{6+}$ hydrocarbons as these hydrocarbons usually have boiling points close to the boiling point of $C_{6+}$ aromatic hydrocarbons. Hence, it can be difficult to separate the non-aromatic $C_{6+}$ hydrocarbons from the aromatic $C_{6+}$ hydrocarbons comprised in the hydrocracking product stream by distillation.

Process Conditions

The process conditions under which the hydrocracking of the feedstream is performed are an important determinant for the composition of the hydrocracking product stream.

In general, when the space velocity is too high, not all co-boilers of BTX are hydrocracked, so it will not be possible to obtain a chemical grade BTX by simple distillation of the product stream. However, at too low space velocity the yield of methane rises at the expense of propane and butane. Also, a higher space velocity requires smaller reactor volumes and thus a lower CAPEX. Hence, it is advantageous to perform the process of the invention at a high space velocity at which substantially all co-coilers of BTX are hydrocracked.

It was found that the hydrocracking step (b) can advantageously be performed at a high space velocity while allowing substantially all co-boilers of BTX to be hydrocracked, due to the high activity of the catalyst. In the catalyst used in the process of the invention, without wishing to be bound by theory, the hydrogenation metal and the zeolite acid site are in close proximity to one another which translates into a shorter diffusion length between the two sites. This allows BTX co-boilers to be hydrocracked at a high space velocity.

Accordingly, in some preferred embodiments, the step (b) is performed at a Weight Hourly Space Velocity (WHSV) of 3-30 $h^{-1}$, for example at least 5 $h^{-1}$, at least 6 $h^{-1}$, at least 7 $h^{-1}$ or at least 8 $h^{-1}$, and/or at most 25 $h^{-1}$, at most 20 $h^{-1}$, at most 15 $h^{-1}$, at most 10 $h^{-1}$. High WHSV such as at least 8 $h^{-1}$ allows particularly small reactor volumes and lower capital expenditure (CAPEX).

It has also been found that step (b) can be operated at a relatively low temperature. This allows for greater operational flexibility as well as lower heat duty and may allow longer cycle lengths. Accordingly, in some preferred embodiments, the step (b) is performed at a temperature of 425-445° C. In other embodiments, the step (b) is performed at a temperature of 450-580° C. The higher temperature range results in a high hydrocracking conversion rate.

The hydrocracking of the feedstream is performed at a pressure of 300-5000 kPa gauge, more preferably at a pressure of 600-3000 kPa gauge, particularly preferably at a pressure of 1000-2000 kPa gauge and most preferably at a pressure of 1200-1600 kPa gauge. By increasing reactor pressure, conversion of $C_{5+}$ non-aromatics can be increased, but higher pressure also increases the yield of methane and the hydrogenation of aromatic rings to cyclohexane species which can be cracked to LPG species. This results in a reduction in aromatic yield as the pressure is increased and, as some cyclohexane and its isomer methylcyclopentane, are not fully hydrocracked, there is an optimum in the purity of the resultant benzene at a pressure of 1200-1600 kPa.

The hydrocracking step is performed in the presence of an excess of hydrogen in the reaction mixture. This means that a more than stoichiometric amount of hydrogen is present in the reaction mixture that is subjected to hydrocracking. Preferably, the molar ratio of hydrogen to hydrocarbon species ($H_2$/HC molar ratio) in the reactor feed is between 1:1 and 4:1, preferably between 1:1 and 3:1 and most preferably between 2:1 and 3:1. A higher benzene purity in the product stream can be obtained by selecting a relatively low $H_2$/HC molar ratio. In this context the term "hydrocarbon species" means all hydrocarbon molecules present in the reactor feed such as benzene, toluene, hexane, cyclohexane, etc. It is necessary to know the composition of the feed to then calculate the average molecular weight of this stream to be able to calculate the correct hydrogen feed rate. The excess amount of hydrogen in the reaction mixture suppresses the coke formation which is believed to lead to catalyst deactivation.

Step (c)

The hydrocracking product stream comprises methane, LPG, BTX. The hydrocracking product stream may be subjected to separation by standard means and methods suitable for separating methane and unreacted hydrogen comprised in the hydrocracking product stream as a first separate stream, the LPG comprised in the hydrocracking product stream as a second separate stream and BTX as a third separate stream. Preferably, the stream comprising BTX is separated from the hydrocracking product stream by gas-liquid separation or distillation.

One non-limiting example of such a separation method of the hydrocracking product stream includes a series of distillation steps. The first distillation step at moderate temperature is to separate most of the aromatic species (liquid product) from the hydrogen, $H_2S$, methane and LPG species. The gaseous stream from this distillation is further cooled (to about −30° C.) and distilled again to separate the remaining aromatics species and most of the propane and butane. The gaseous product (mainly hydrogen, $H_2S$, methane and ethane) is then further cooled (to about −100° C.) to separate the ethane and leave the hydrogen, $H_2S$ and methane in the gaseous stream that will be recycled back to the hydrocracking reactor. To control the levels of $H_2S$ and methane in the reactor feed, a proportion of this recycle gas stream is removed from the system as a purge. The quantity of material that is purged depends on the levels of methane and $H_2S$ in the recycle stream which in turn depend on the feed composition. As the purge will contain mainly hydrogen and methane it is suitable for use as a fuel gas or may be further treated (e.g. via a pressure swing adsorption unit) to separately recover a high purity hydrogen stream and a methane/$H_2S$ stream which can be used as a fuel gas.

In a further embodiment, the present invention relates to a process for producing benzene from a feedstream comprising $C_5$-$C_{12}$ hydrocarbons, wherein the said process comprises the process for producing BTX of the present invention further comprising the step of contacting BTX (or only the toluene and xylenes fraction of said BTX produced) with hydrogen under conditions suitable to produce a hydrodealkylation product stream comprising benzene and fuel gas.

The conditions suitable to produce a hydrodealkylation product stream comprising benzene and fuel gas are well-known and are described in detail e.g. in WO2013/182534, incorporated herein by reference.

Processes for hydrodealkylation of hydrocarbon mixtures comprising $C_6$-$C_9$ aromatic hydrocarbons include thermal hydrodealkylation and catalytic hydrodealkylation; see e.g. WO 2010/102712 A2. Catalytic hydrodealkylation is preferred in the context of the present invention as this hydrodealkylation process generally has a higher selectivity towards benzene than thermal hydrodealkylation. Preferably catalytic hydrodealkylation is employed, wherein the hydrodealkylation catalyst is selected from the group consisting of supported chromium oxide catalyst, supported molybdenum oxide catalyst, platinum on silica or alumina and platinum oxide on silica or alumina. The process conditions useful for hydrodealkylation, also described herein as "hydrodealkylation conditions", can be easily determined by the person skilled in the art. The process conditions used for thermal hydrodealkylation are for instance described in DE 1668719 A1 and include a temperature of 600-800° C., a pressure of 3-10 MPa gauge and a reaction time of 15-45 seconds. The process conditions used for the preferred catalytic hydrodealkylation preferably include a temperature of 500-650° C., a pressure of 3.5-7 MPa gauge and a Weight Hourly Space Velocity of 0.5-2 $h^{-1}$; see also Handbook of Commercial Catalysts: Heterogeneous Catalysts ed. Howard F. Rase (2000) Loc. cit.

The hydrodealkylation product stream is typically separated into a liquid stream (containing benzene and other aromatics species) and a gas stream (containing hydrogen, $H_2S$, methane and other low boiling point hydrocarbons) by a combination of cooling and distillation. The liquid stream may be further separated, by distillation, into a benzene stream, a $C_7$ to $C_9$ aromatics stream and a heavy aromatic stream. The $C_7$ to $C_9$ aromatic stream, or some part of it, may be fed back to reactor section as a recycle to increase overall conversion and benzene yield. The heavy aromatic stream, which contains polyaromatic species such as biphenyl, is preferably not recycled to the reactor but may be exported as a separate product stream. The gas stream contains significant quantities of hydrogen and may be recycled back, via a recycle gas compressor, to the reactor section. A recycle gas purge may be used to control the concentrations of methane and $H_2S$ in the reactor feed.

It is noted that the invention relates to all possible combinations of features described herein, and preferred in particular are those combinations of features that are present in the claims. It will therefore be appreciated that all combinations of features relating to the composition according to the invention, all combinations of features relating to the process according to the invention, and all combinations of features relating to the composition according to the invention and features relating to the process according to the invention are described herein.

It is further noted that the term 'comprising' does not exclude the presence of other elements. However, it is also to be understood that a description of a product/composition comprising certain components also discloses a product/composition consisting of these components. The product/composition consisting of these components may be advantageous in that it offers a simpler, more economical process for the preparation of the product/composition. Similarly, it is also to be understood that a description of a process comprising certain steps also discloses a process consisting of these steps. The process consisting of these steps may be advantageous in that it offers a simpler, more economical process.

The invention is now elucidated by way of the following examples, without however being limited thereto.

EXAMPLES OF CATALYST SYNTHESIS

In the examples herein described, "zeolite extrudates" refer to ZSM-5 extrudates (CBV 5524G CY (1.6) obtained from Zeolyst International) containing 80 wt % ZSM-5 ($SiO_2/Al_2O_3$=50) and 20 wt % $Al_2O_3$ as a binder, which were calcined at 550° C. for 10 h and then stored in a container. The ZSM-5 in the extrudates is in the H-form and contains <0.05 wt % $Na_2O$.

Experiment Set 1: Non-Uniform Pt Distribution (Shell Formation)

Catalysts A-C were prepared by an ion-exchange method using $(NH_3)_4Pt(NO_3)_2$ solution. No ammonium salt was used.

Catalyst A 8.2017 g 0.005M $(NH_3)_4Pt(NO_3)_2$ solution were diluted with 49.2 g of D.I. water in a 500 ml conical glass flask. 10.0 g of zeolite extrudates were poured into the solution. The flask with this mixture was put on a heating plate. Ion-exchange was done at 60° C. with stirring for 24 h. The pH of the final solution was 4.04. The solution was then decanted and extrudates were rinsed with 500 ml D.I. water at room temperature (RT) in 5 steps, and extrudates were then stirred in 300 ml D.I. water (RT) for 10 minutes. Water was decanted and the extrudates were dried/calcined in air at 90° C. for 15 h and then ramped at 3° C./min to 280° C. and held at this temperature for 6 h.

Catalyst appearance: the extrudates had a grey-colored shell but were white internally.

Catalyst B

The catalyst was prepared by stirring 10.0 g of zeolite extrudates with 16.40 g of 0.005M $(NH_3)_4Pt(NO_3)_2$ solution in a 250 ml round bottom flask. The flask was attached to a rotoevaporator and immersed into a preheated (~97° C.) water bath. Rotation was made for 23 min, then vacuum was applied for about 20 min to evaporate water. The extrudates were collected into a calcination dish and dried/calcined in air at 90° C. for 8 h and then at 280° C. for 3 h.

Catalyst appearance: the extrudates had a grey-colored shell but were white internally.

Catalyst C 28.71 g 0.005M $(NH_3)_4Pt(NO_3)_2$ solution were diluted with 114.85 g of D.I. water in a 500 ml conical glass flask (pH=5.41). 10.0 of g zeolite extrudates were poured into solution. The flask with this mixture was put on a heating plate. Ion-exchange was done at 60° C. with stirring for 24 h. The pH of the final solution was 3.72. The solution was then decanted and the extrudates were rinsed with 500 ml D.I. water (RT) in 5 steps. The extrudates were then stirred in 300 ml D.I. water (RT) for 10 minutes, water was decanted, and the extrudates were dried/calcined in air at 90° C. for 8 h and at 280° C. for 6 h.

Catalyst appearance: the extrudates had a grey-colored shell but were white internally.

TABLE 1

| $(NH_3)_4Pt(NO_3)_2$ as Pt source (without ammonium salt) | | |
|---|---|---|
| Catalyst | Pt wt. % | Pt Distribution |
| A | 0.07 | Non-uniform[1] |
| B | 0.13 | Non-uniform[1] |
| C | 0.27 | Non-uniform[1,2] |

[1]Grey colored shell and pure white internal part of extrudates was observed;
[2]Non-uniform Pt distribution was observed by SEM-EDX (see later).

Experiment Set 2: Non-Uniform Pt Distribution (Shell Formation)

Catalyst D was prepared by treating the zeolite extrudates first with $NH_4Cl$ and subsequently treating with $(NH_3)_4Pt(NO_3)_2$ solution.

Extrudates Treated with $NH_4Cl$ 2.32 g $NH_4Cl$ (99.5%; Sigma-Aldrich) were dissolved in 57.56 g of D.I. water in a 500 ml glass conical flask (pH=4.98). 10.0 g of zeolite extrudates were poured in the solution and were stirred at 60° C. for 24 h, then 43.16 g of D.I. water were added and stirring was continued for 1.5 h (pH=3.80). The solution was decanted, and the extrudates were rinsed with 400 ml D.I. water in 5 steps and then stirred in 400 ml D.I. water for 10 min. at RT. The extrudates were dried/calcined in air at 90° C. for 10 h, at 300° C. for 3 h and at 550° C. for 6 h.

No significant difference was observed in surface area (BET) and porosity for the untreated extrudates and $NH_4Cl$ treated extrudates as shown below.

TABLE 2

| Sample | Surface area, m²/g | Total pore volume, cc/g | Micro-pore volume, cc/g |
|---|---|---|---|
| untreated zeolite extrudates | 342.1 | 0.5244 | 0.09064 |
| extrudates treated with $NH_4Cl$ | 334.5 | 0.5459 | 0.08912 |

10.0 g of $NH_4Cl$ treated zeolite extrudates were stirred in 14.37 g of 0.005M $(NH_3)_4Pt(NO_3)_2$ solution (pH=5.70) at 60° C. for 34 h (pH=3.70). The solution was then decanted and the extrudates were rinsed several time with ~150 ml D.I. water and then stirred in 125 ml D.I. water for 10 min at RT. The extrudates were then dried/calcined in air at 90° C. for 10 h and at 280° C. for 3 h.

Catalyst appearance: non-uniform Pt distribution with shell formation on the outside surface of the extrudates was observed.

Experiment Set 3: Uniform Pt Distribution (No Shell Formation)

Catalysts E-G were prepared by an ion-exchange method using $(NH_3)_4Pt(NO_3)_2$ solution in combination with $NH_4Cl$.

Catalyst E 100 g of zeolite extrudates were placed into a solution of 82.017 g of 0.005M $(NH_3)_4Pt(NO_3)_2$ solution mixed with 3.3069 g of $NH_4Cl$ and diluted with 492 g of D.I. water inside of a 1.8 L glass conical flask. The flask was placed on the top of a magnetic heating plate and ion-exchange was done at 60° C. with stirring for 1 day. The pH of the final solution was 3.49. Then solution was decanted and extrudates were rinsed with 1 L of D.I. water 5 times and additionally stirred in 1 L of D.I. water for 10 min. The extrudates were dried/calcined in air at 90° C. for 8 h and then at 280° C. for 6 h.

Catalyst appearance: uniform white extrudate coloration outside and inside.

Catalyst F

Zeolite extrudates (3.0 g) were placed into a 125 ml conical flask containing 8.61 ml of 0.005M $(NH_3)_4Pt(NO_3)_2$ solution and 0.2320 g of $NH_4Cl$. The flask was placed on the top of a magnetic heating plate and ion exchange was done at 60° C. with stirring for 1 day. The solution was then decanted and the extrudates were rinsed with D.I. water. The extrudates were dried/calcined in air at 90° C. for 8 h and then at 280° C. for 3 h.

Catalyst appearance: uniform grey extrudate coloration outside and inside.

Catalyst G Zeolite extrudates (10 g) were placed into a solution of 28.706 g of 0.005M $(NH_3)_4Pt(NO_3)_2$ solution (pH=6.27) mixed with 1.157 g of $NH_4Cl$ and diluted with 114.85 g of D.I. water. The flask was placed on the top of a magnetic heating plate and ion-exchange was done at 60° C. with stirring for 1 day. The pH of the final solution was 3.66. The solution was then decanted and the extrudates were rinsed with 500 ml of D.I. water and additionally stirred in 500 ml of D.I. water for 15 min. The extrudates were dried/calcined in air at 90° C. for 8 h and at 280° C. for 6 h.

Catalyst appearance: uniform grey extrudate coloration outside and inside.

The results of Pt analysis (XRF) and concentration of Pt used for samples preparation are presented in Table 3.

TABLE 3

(NH$_3$)$_4$Pt(NO$_3$)$_2$ as Pt source plus NH$_4$Cl

| Catalyst | [NH$_4$]$^+$/Pt, mol. | Pt, wt. % | Pt Distribution |
|---|---|---|---|
| E | 150 | 0.07 | Uniform[1] |
| F | 100 | 0.23 | Uniform[2] |
| G | 150 | 0.26 | Uniform[2,3] |

[1]Uniform white extrudate coloration outside and inside.
[2]Uniform grey extrudate coloration outside and inside.
[3]Pt was observed across the extrudate by SEM-EDX (see later).

Experiment Set 4: Uniform Pt Distribution

Catalysts H-I were prepared by an ion-exchange method using (NH$_3$)$_4$Pt(NO$_3$)$_2$ solution in combination with NH$_4$NO$_3$.

Catalyst H 10.0 g of zeolite extrudates were placed into solution of 8.21 g of 0.005M (NH$_3$)$_4$Pt(NO$_3$)$_2$ solution diluted with 49.2 g of D.I. water and mixed with 0.4927 g of NH$_4$NO$_3$ in a 500 ml glass conical flask. The flask was placed on the top of a magnetic heating plate and ion exchange was done at 60° C. with stirring for 1 day. The pH of the final solution was 3.53. Then solution was decanted and the extrudates were rinsed with 1 L of D.I. water 5 times and additionally stirred in 1 L of D.I. water for 10 min. The extrudates were dried/calcined in air at 90° C. for 8 h and then at 280° C. for 6 h.

Catalyst appearance: uniform white extrudate coloration outside and inside.

Catalyst I 10 g of zeolite extrudates were placed into a solution of 8.2015 g of 0.005M (NH$_3$)$_4$Pt(NO$_3$)$_2$ solution diluted with 49.2 g of D.I. water and mixed with 4.9236 g of NH$_4$NO$_3$ (pH=4.68) in a 500 ml glass conical flask. The flask was placed on the top of a magnetic heating plate and ion exchange was done at 60° C. with stirring for 1 day. The pH of the final solution was 3.67. The solution was then decanted and the extrudates were rinsed with 1 L of D.I. water 5 times and additionally stirred in 1 L of D.I. water for 10 min. The extrudates were dried/calcined in air at 90° C. for 8 h and then at 280° C. for 6 h.

Sample appearance: uniform white extrudate coloration outside and inside.

The results of Pt analysis (XRF) and concentration of Pt used for sample preparation are presented in Table 4.

TABLE 4

(NH$_3$)$_4$Pt(NO$_3$)$_2$ as Pt source plus NH$_4$NO$_3$

| Catalyst | [NH$_4$]$^+$/Pt, mol. | Pt, wt. % | Pt Distribution |
|---|---|---|---|
| H | 150 | 0.06 | Uniform[1] |
| I | 1500 | 0.05 | Uniform[1] |

[1]Uniform white extrudate coloration outside and inside.

Experiment Set 5: Uniform Pt Distribution

Catalysts J-N were prepared by an ion-exchange method using (NH$_3$)$_4$Pt(NO$_3$)$_2$ solution in combination with (NH$_4$)$_2$CO$_3$ or NH$_4$HCO$_3$.

Catalyst J 10 g of zeolite extrudates were placed into a solution of 8.21 g of 0.005M (NH$_3$)$_4$Pt(NO$_3$)$_2$ solution diluted with 49.23 g of D.I. water and mixed with 0.2958 g of (NH$_4$)$_2$CO$_3$ (pH=8.58) in a 500 ml glass conical flask. The flask was placed on the top of a magnetic heating plate and ion-exchange was done at 60° C. with stirring for 1 day. The pH of the final solution was 8.50. The solution was then decanted and the extrudates were rinsed with 500 ml of D.I. water 5 times and additionally stirred in 300 ml of D.I. water for 10 min. The extrudates were dried/calcined in air at 90° C. for 8 h and then at 280° C. for 6 h.

Sample appearance: uniform white extrudate coloration outside and inside.

Catalyst K 10 g of zeolite extrudates were placed into a solution of 8.21 g of 0.005M (NH$_3$)$_4$Pt(NO$_3$)$_2$ solution diluted with 49.23 g D.I. water and mixed with 2.9553 g of (NH$_4$)$_2$CO$_3$ (pH=8.68) in a 500 ml glass conical flask. The flask was placed on the top of a magnetic heating plate and ion-exchange was done at 60° C. with stirring for 1 day. The pH of the final solution was 9.45. The solution was then decanted and the extrudates were rinsed with 500 ml of D.I. water 5 times and additionally stirred in 300 ml of D.I. water for 10 min. The extrudates were dried/calcined in air at 90° C. for 8 h and then at 280° C. for 6 h.

Sample appearance: uniform white extrudate coloration outside and inside.

Catalyst L 10 g of zeolite extrudates were placed into a solution of 8.21 g of 0.005M (NH$_3$)$_4$Pt(NO$_3$)$_2$ solution diluted with 49.23 g D.I. water and mixed with 5.9108 g of (NH$_4$)$_2$CO$_3$ (pH=8.69) in a 500 ml glass conical flask. The flask was placed on the top of a magnetic heating plate and ion-exchange was done at 60° C. with stirring for 1 day. The pH of the final solution was 9.45. The solution was then decanted and extrudates were rinsed with 500 ml D.I. water 5 times and additionally stirred in 300 ml of D.I. water for 10 min. The extrudates were dried/calcined in air at 90° C. for 8 h and then at 280° C. for 6 h.

Sample appearance: uniform white extrudate coloration outside and inside.

Catalyst M 10 g of zeolite extrudates were placed into a solution of 8.21 g of 0.005M (NH$_3$)$_4$Pt(NO$_3$)$_2$ solution diluted with 49.23 g D.I. water and mixed with 0.4913 g of NH$_4$HCO$_3$ (pH=7.87) in a 500 ml glass conical flask. The flask was placed on the top of a magnetic heating plate and ion-exchange was done at 60° C. with stirring for 1 day. The pH of the final solution was 8.67. The solution was then decanted and the extrudates were rinsed with 500 ml of D.I. water 5 times and additionally stirred in 300 ml of D.I. water for 10 min. The extrudates were dried/calcined in air at 90° C. for 8 h and then at 280° C. for 6 h.

Sample appearance: uniform white extrudate coloration outside and inside.

Catalyst N 10 g of zeolite extrudates were placed into a solution of 8.21 g of 0.005M (NH$_3$)$_4$Pt(NO$_3$)$_2$ solution diluted with 49.23 g D.I. water and mixed with 4.9123 g of NH$_4$HCO$_3$ (pH=7.86) in a 500 ml glass conical flask. The flask was placed on the top of a magnetic heating plate and ion-exchange was done at 60° C. with stirring for 1 day. The pH of the final solution was 9.40. The solution was then decanted and the extrudates were rinsed with 500 ml of D.I. water 5 times and additionally stirred in 300 ml of D.I. water for 10 min. The extrudates were dried/calcined in air at 90° C. for 8 h and then at 280° C. for 6 h.

Sample appearance: uniform white extrudate coloration outside and inside.

The results of Pt analysis (XRF) and concentration of Pt used for sample preparation are presented in Table 5.

TABLE 5

$(NH_3)_4Pt(NO_3)_2$ as Pt source plus [$NH_4HCO_3$ or $(NH_4)_2CO_3$]

| Catalyst | Additive | [NH4]$^+$/Pt | Pt, wt. % | Pt Distribution |
|---|---|---|---|---|
| J | $(NH_4)_2CO_3$ | 150 | 0.06 | Uniform[1] |
| K | $(NH_4)_2CO_3$ | 1500 | 0.08 | Uniform[1] |
| L | $(NH_4)_2CO_3$ | 3000 | 0.07 | Uniform[1] |
| M | $NH_4HCO_3$ | 150 | 0.08 | Uniform[1] |
| N | $NH_4HCO_3$ | 1500 | 0.08 | Uniform[1] |

[1]Uniform white extrudate coloration outside and inside

Experiment Set 6:

Catalysts O-Q were prepared by an ion-exchange method using $(NH_3)_4Pt(NO_3)_2$ solution with or without $NH_4Cl$.

Catalyst O 10.0 g of zeolite extrudates were stirred in 82.025 g of 0.001 M $(NH_3)_4Pt(OH)_2H_2O$ solution (pH=8.10) at 60° C. for 24 h. The extrudates were then rinsed with 500 ml of D.I. water 5 times and stirred in 300 ml of D.I. water for about 20 min. The extrudates were then dried at 90° C. and calcined in air at 280° C. for 6 h.

Catalyst appearance: internally the extrudates were white and Pt was deposited in the form of a grey shell on the outer surface.

Catalyst P 0.3305 g $NH_4Cl$ was dissolved in a 41.01 g solution of 0.001M $(NH_3)_4Pt(OH)_2$ and diluted with 102.5 g of D.I. water (pH=7.19). 10 g of zeolite extrudates were stirred in the prepared solution at 60° C. for 24 h. The pH of the final solution was 3.71. The extrudates were then rinsed with 500 ml D.I. water 5 times and stirred in 300 ml D.I. water for about 10 min. The extrudates were then dried/calcined in air at 90° C. for 7 h and at 280° C. for 6 h.

Catalyst appearance: uniform white extrudate coloration outside and inside.

Catalyst Q 0.6616 g of $NH_4Cl$ was dissolved in 82.01 g of 0.001 M $(NH_3)_4Pt(OH)_2H_2O$ solution and diluted with 61.53 g of D.I. water (pH=7.12). 10.0 g of zeolite extrudates were stirred in the prepared solution at 60° C. for 24 h. The final pH of the solution was 3.74. The extudates were then rinsed with 500 ml D.I. water 5 times and stirred in 300 ml of D.I. water for about 10 min. The extrudates were then dried in air at 90° C. for 7 h and calcined in air at 280° C. for 6 h.

Catalyst appearance: uniform white extrudate coloration outside and inside.

TABLE 6

$(NH_3)_4Pt(OH)_2$ as Pt source with or without additive $NH_4Cl$

| Catalyst | [NH$_4$]$^+$/Pt, mol. | Pt analyzed, wt. % | Pt Distribution |
|---|---|---|---|
| O | 0 | 0.12 | Not uniform[1,2] |
| P | 150 | 0.07 | Uniform[3] |
| Q | 150 | 0.13 | Uniform[3,4] |

[1]Grey colored shell and pure white internal part of extrudates was observed;
[2]Non-uniform Pt distribution was observed by SEM-EDX (see later).
[3]Uniform white extrudate coloration outside and inside;
[4]Uniform Pt distribution was observed by SEM-EDX (see later).

Experiment Set 7

Pt Distribution Measured by SEM-EDX

Cross sectional SEM micrographs of the catalyst extrudates were acquired using a Carl Zeiss Supra 40 VP Scanning electron microscope. To analyze the dispersion of Pt across the extrudate, SEM was combined with energy dispersive X-ray spectroscopy (EDX) detection. Spectra were acquired from a line scan at different points. The acquisition was conducted at an acceleration voltage 30 kV using a standard aperture of 30 μm at a working distance of 14 mm.

The SEM-EDX analysis shows that in catalysts C and O, Pt was not distributed uniformly across the catalyst extrudate, while in catalysts G and Q, Pt was evenly distributed across the catalyst extrudate.

Experiment Set 8: Catalyst Activity

A selection of the catalysts described above was tested for hydrocracking reaction using a stainless steel tube reactor as described below. 0.10 g catalyst (sized to 20-40 mesh) was diluted to 3 ml by premixing with SiC (30 grit) and was loaded in the reactor.

Reactor description: ¼" inch tube, 0.028" wall thickness. 1/16" thermocouple with a ⅛" spacer bar; 12"×1" brass over-sleeve; reactor bed is approx. 5-6 inches in length in center of sleeve.

The catalyst was pre-activated (drying, Pt reduction) by subjecting it to 40 standard cubic centimeters (sccm) of $H_2$ per minute at 130° C. under 50 psig for 2 hours and subsequently 40 sccm of $H_2$ (with 50 ppm of $H_2S$) at 350° C. and 50 psig for 30 min.

The hydrocracking feed stream consisted of 70 wt % benzene, 15 wt % 3-methylpentane and 15 wt % methylcyclopentane. All components of the hydrocracking feed stream are Aldrich regent grade chemicals dried with 4 A molecular sieves overnight.

The hydrocracking feed stream was introduced to the reactor at a temperature of 470° C. and a pressure of 200 psig. The molar ratio of $H_2$ to the hydrocarbons was 4 to 1, and the $H_2S$ content was 50 ppm based on the total hydrocarbon and $H_2$ feed.

In all experiments, the WHSV was adjusted to achieve the benzene purity (amount of benzene/amount of benzene plus benzene co-boilers) of 99.82 wt % in the product stream.

EXAMPLE 1

Catalyst A, weight 0.10 g

Catalyst pretreatment: (a) drying: under 40 sccm $H_2$ at 50 psig at 130° C. for 2 h; (b) subsequent $H_2S$ treatment: 40 sccm of $H_2$ (with 50 ppm of $H_2S$) at 50 psig at 350° C. for 30 min Hydrocarbon feed composition: 70.0 wt % benzene, 15.0 wt % 3-methylpentane, 15.0 wt % methylcyclopentane Hydrocarbon feed rate varied from 10.3 to 20.6 μl/min to run at WHSV 4.86 to 9.72 h$^{-1}$. $H_2$ (+$H_2S$) rate: varied to maintain $H_2$ to HC molar ratio of 4 to 1, and $H_2S$ content 50 ppm based on total feed Catalyst bed temperature 470° C., pressure 200 psig

EXAMPLE 2

Catalyst E, weight 0.10 g

Catalyst pretreatment: same as described in example 1.

Hydrocarbon feed composition and rate: same as described in example 1.

Hydrocarbon feed rate varied from 20.6 to 30.9 μl/min to run at WHSV 10.0 to 15.0 h$^{-1}$.

$H_2$ (+$H_2S$) rate: varied as described in example 1.

Catalyst bed temperature 470° C., pressure 200 psig.

EXAMPLE 3

Catalyst H, weight 0.10 g

Catalyst pretreatment: same as described in example 1.

Hydrocarbon feed composition and rate: same as described in example 1.

Hydrocarbon feed rate varied from 20.6 to 24.7 μl/min to run at WHSV 10.0 to 11.5 h⁻¹. H₂ (+H₂S) rate: varied as described in example 1.

Catalyst bed temperature 470° C., pressure 200 psig.

EXAMPLE 4

Catalyst I, weight 0.10 g
Catalyst pretreatment: same as described in example 1.
Hydrocarbon feed composition and rate: same as described in example 1.
Hydrocarbon feed rate varied from 20.6 to 22.7 μl/min to run at WHSV 10.0 to 11.0 h⁻¹.
H₂ (+H₂S) rate: varied as described in example 1.
Catalyst bed temperature 470° C., pressure 200 psig.

Hydrocarbon feed rate varied from 18.5 to 20.6 μl/min to run at WHSV 9.2 to 10.0 h⁻¹.
H₂ (+H₂S) rate: varied as described in example 1.
Catalyst bed temperature 470° C., pressure 200 psig.

EXAMPLE 8

Catalyst N, weight 0.10 g
Catalyst pretreatment: same as described in example 1.
Hydrocarbon feed composition and rate: same as described in example 1.
Hydrocarbon feed rate varied from 20.6 to 22.7 μl/min to run at WHSV 10.0 to 11.0 h⁻¹.
H₂ (+H₂S) rate: varied as described in example 1.
Catalyst bed temperature 470° C., pressure 200 psig.

TABLE 8

Hydrocracking performance of various catalysts made using $(NH_3)_4Pt(NO_3)_2$ as the Pt source, with and without additive

| Ex | Catalyst | Additive | $[(NH_4)^+]$/Pt | Shell Formation | Pt, wt % | WHSV/h | $CH_4$ | Lights | Benzene | Aromatics[1] |
|---|---|---|---|---|---|---|---|---|---|---|
| 1 | A | None | 0 | Shell formed | 0.07 | Low activity[2] | | | | |
| 2 | E | $NH_4Cl$ | 150 | No | 0.07 | 12.96 | 1.32 | 27.78 | 67.29 | 72.06 |
| 3 | H | $NH_4NO_3$ | 150 | No | 0.08 | 10.28 | 1.45 | 32.01 | 64.40 | 67.84 |
| 4 | I | $NH_4NO_3$ | 1500 | No | 0.08 | 10.57 | 1.30 | 28.22 | 67.13 | 71.65 |
| 5 | K | $(NH_4)_2CO_3$ | 1500 | No | 0.08 | 13.61 | 1.33 | 28.66 | 65.92 | 71.20 |
| 6 | L | $(NH_4)_2CO_3$ | 3000 | No | 0.07 | 12.55 | 1.34 | 27.31 | 67.17 | 72.53 |
| 7 | M | $NH_4HCO_3$ | 150 | No | 0.07 | 9.70 | 1.45 | 31.56 | 63.92 | 68.31 |
| 8 | N | $NH_4HCO_3$ | 1500 | No | 0.08 | 10.01[a] | 1.39 | 29.82 | 66.26 | 70.05 |

[1]Aromatics = total aromatics
[2]benzene purity of 99.82% could not be reached at WHSV 4.9-9.7/h suggesting low catalyst activity compared to the other catalysts listed in the table.
[a]at benzene purity 99.83%

EXAMPLE 5

Catalyst K, weight 0.10 g
Catalyst pretreatment: same as described in example 1.
Hydrocarbon feed composition and rate: same as described in example 1.
Hydrocarbon feed rate varied from 20.6 to 30.9 μl/min to run at WHSV 10.0 to 14.6 h⁻¹.
H₂ (+H₂S) rate: varied as described in example 1.
Catalyst bed temperature 470° C., pressure 200 psig.

EXAMPLE 6

Catalyst L, weight 0.10 g
Catalyst pretreatment: same as described in example 1.
Hydrocarbon feed composition and rate: same as described in example 1.
Hydrocarbon feed rate varied from 20.6 to 28.8 μl/min to run at WHSV 10.0 to 14.0 h⁻¹.
H₂ (+H₂S) rate: varied as described in example 1.
Catalyst bed temperature 470° C., pressure 200 psig.

EXAMPLE 7

Catalyst M, weight 0.10 g
Catalyst pretreatment: same as described in example 1.
Hydrocarbon feed composition and rate: same as described in example 1.

It can be understood that the catalyst(s) in which the Pt distribution was non-uniform or formed a shell did not reach a benzene purity of 99.82 wt % in the effluent even at about 50% lower WHSV (example 1) compared to the catalysts in which Pt distribution was uniform (examples 2-8). One can conclude that catalysts with uniform Pt distribution, that is, with no shell formation showed high activity (WHSV 9.7 to 13.6/h) with benzene and total aromatics yields 63.9-67.3% and 67.8-72.5%, respectively.

The invention claimed is:

1. A process for preparing a hydrocracking catalyst, comprising:
   (i) contacting a shaped body comprising a zeolite and a binder with an aqueous solution of a hydrogenation metal compound which is a complex or a salt of a hydrogenation metal to deposit the hydrogenation metal onto the shaped body by ion exchange, wherein the aqueous solution comprises an ammonium salt; and
   (ii) calcining the shaped body obtained by step (i), wherein the amount of the hydrogenation metal is 0.015-0.095 wt %, with respect to the total catalyst.

2. The process according to claim 1, wherein the hydrogenation metal is at least one element selected from Group 10 of the periodic table of elements or rhodium or iridium.

3. The process according to claim 1, wherein the hydrogenation metal compound is a metal amine complex.

4. The process according to claim 1, wherein the hydrogenation metal compound is free of chlorine.

5. The process according to claim 1, wherein the ammonium salt is selected from the group consisting of $NH_4Cl$, $NH_4NO_3$, $(NH_4)_2CO_3$ and $NH_4HCO_3$.

6. The process according to claim 1, wherein the ammonium salt is free of chlorine.

7. A process for preparing a hydrocracking catalyst, comprising:
(i) contacting a shaped body comprising a zeolite and a binder with an aqueous solution of a hydrogenation metal compound which is a complex or a salt of a hydrogenation metal to deposit the hydrogenation metal onto the shaped body, wherein the aqueous solution comprises an ammonium salt; and
(ii) calcining the shaped body obtained by step (i),
wherein the zeolite comprises ZSM-5, MCM-22, ZSM-11, beta zeolite, EU-1 zeolite, ferrierite, or mordenite, and
wherein the amount of the hydrogenation metal is 0.015-0.095 wt %, with respect to the total catalyst.

8. The process according to claim 1, wherein the zeolite has a silica ($SiO_2$) to alumina ($Al_2O_3$) molar ratio of 25-75.

9. A process for preparing a hydrocracking catalyst, comprising:
(i) contacting a shaped body comprising a zeolite and a binder with an aqueous solution of a hydrogenation metal compound which is a complex or a salt of a hydrogenation metal to deposit the hydrogenation metal onto the shaped body, wherein the aqueous solution comprises an ammonium salt; and
(ii) calcining the shaped body obtained by step (i),
wherein the amount of the hydrogenation metal is 0.015-0.095 wt %, with respect to the total catalyst.

10. The process according to claim 1, wherein the shaped body is an extrudate having an average diameter of 0.1-3 mm.

11. The process according to claim 3, wherein the hydrogenation metal compound is selected from the group consisting of $(NH_3)_4Pt(NO_3)_2$, $(NH_3)_4Pt(OH)_2$ and $(NH_3)_4PtCl_2$.

12. The process according to claim 1, wherein the hydrogenation metal compound is selected from the group consisting of $(NH_3)_4Pt(NO_3)_2$ and $(NH_3)_4Pt(OH)_2$.

13. The process according to claim 1, wherein the ammonium salt is $(NH_4)_2CO_3$.

14. The process according to claim 1, wherein the ammonium salt is selected from the group consisting of $NH_4NO_3$, $(NH_4)_2CO_3$ and $NH_4HCO_3$.

15. The process according to claim 1,
wherein the hydrogenation metal compound is selected from the group consisting of $(NH_3)_4Pt(NO_3)_2$ and $(NH_3)_4Pt(OH)_2$;
and
wherein the ammonium salt is selected from the group consisting of $NH_4NO_3$, $(NH_4)_2CO_3$ and $NH_4HCO_3$.

16. The process according to claim 15,
wherein the amount of the hydrogenation metal is 0.035-0.080 wt %, with respect to the total catalyst; and
wherein the zeolite has a silica ($SiO_2$) to alumina ($Al_2O_3$) molar ratio of 35-60.

17. The process according to claim 1, wherein the shaped body is contacted with the aqueous solution and subsequently washed and dried to deposit the hydrogenation metal onto the shaped body by ion exchange.

18. The process according to claim 1, wherein the ion exchange comprises stirring.

19. The process according to claim 1, wherein a molar amount of ammonium/the hydrogenation metal in the aqueous solution is greater than or equal to about 100.

20. The process according to claim 1, wherein a molar amount of ammonium/the hydrogenation metal in the aqueous solution is in a range of 100 to 3000.

* * * * *